United States Patent
Wang

(10) Patent No.: US 8,825,021 B2
(45) Date of Patent: Sep. 2, 2014

(54) HOST MOBILE TERMINAL, LOCKING DEVICE AND METHOD FOR UNLOCKING LOCKING MECHANISM

(75) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 207 days.

(21) Appl. No.: 13/527,790

(22) Filed: Jun. 20, 2012

(65) Prior Publication Data

US 2013/0095802 A1    Apr. 18, 2013

(30) Foreign Application Priority Data

Oct. 14, 2011  (CN) .......................... 2011 1 0311529

(51) Int. Cl.
*H04M 3/42*    (2006.01)

(52) U.S. Cl.
USPC .................. 455/414.1; 455/414.2; 455/456.1; 455/411; 455/457; 340/5.2; 340/5.53; 340/5.83

(58) Field of Classification Search
CPC ................. H04W 12/06; H04W 4/021–4/023; H04L 63/08; H04L 63/083; H04L 63/0838; H04L 63/0853; H04L 63/0861; G07C 9/00309; G07C 9/00563
USPC .......................... 455/411, 418, 414.1–414.2, 455/456.1–456.6, 457; 340/686.6, 5.2, 340/5.21–5.28, 5.53, 5.83; 382/118
See application file for complete search history.

(56) References Cited

U.S. PATENT DOCUMENTS

| | | | |
|---|---|---|---|
| 2009/0097713 A1* | 4/2009 | DeLean ........................ | 382/115 |
| 2011/0159856 A1* | 6/2011 | Walsh et al. ................ | 455/414.2 |
| 2012/0280790 A1* | 11/2012 | Gerhardt et al. ............. | 340/5.61 |
| 2013/0052990 A1* | 2/2013 | Zhang .......................... | 455/411 |

* cited by examiner

*Primary Examiner* — Wayne Cai
(74) *Attorney, Agent, or Firm* — Novak Druce Connolly Bove + Quigg LLP

(57) ABSTRACT

An unlocking method enabling a locking mechanism to be unlocked, includes the following step of: detecting whether an authentication instruction from a host mobile terminal is received. First, transmitting a location search instruction to a caller mobile terminal when the authentication instruction is received. Next, receiving a location of the caller mobile terminal generated in response to the location search instruction from the caller mobile terminal. Then, determining whether the caller mobile terminal is within a predetermined distance based on the location. Finally, unlocking the locking mechanism when the caller mobile terminal is within the predetermined distance.

10 Claims, 5 Drawing Sheets

HOST MOBILE TERMINAL, LOCKING DEVICE AND METHOD FOR UNLOCKING LOCKING MECHANISM

BACKGROUND

1. Technical Field

The present disclosure relates to electronic locking systems, and particularly to a host mobile terminal, a locking device and an unlocking method for unlocking a locking mechanism.

2. Description of Related Art

To secure a home, the homeowner locks an access door with locking devices. However, the typical locking devices, such as mechanical locks or electronic locks are opened by keys from a close vicinity of the locking devices. When repairs or other work needs to be done on the home, the homeowner must be home to provide access to the home for the service personnel, this may be an inconvenience to the homeowner.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
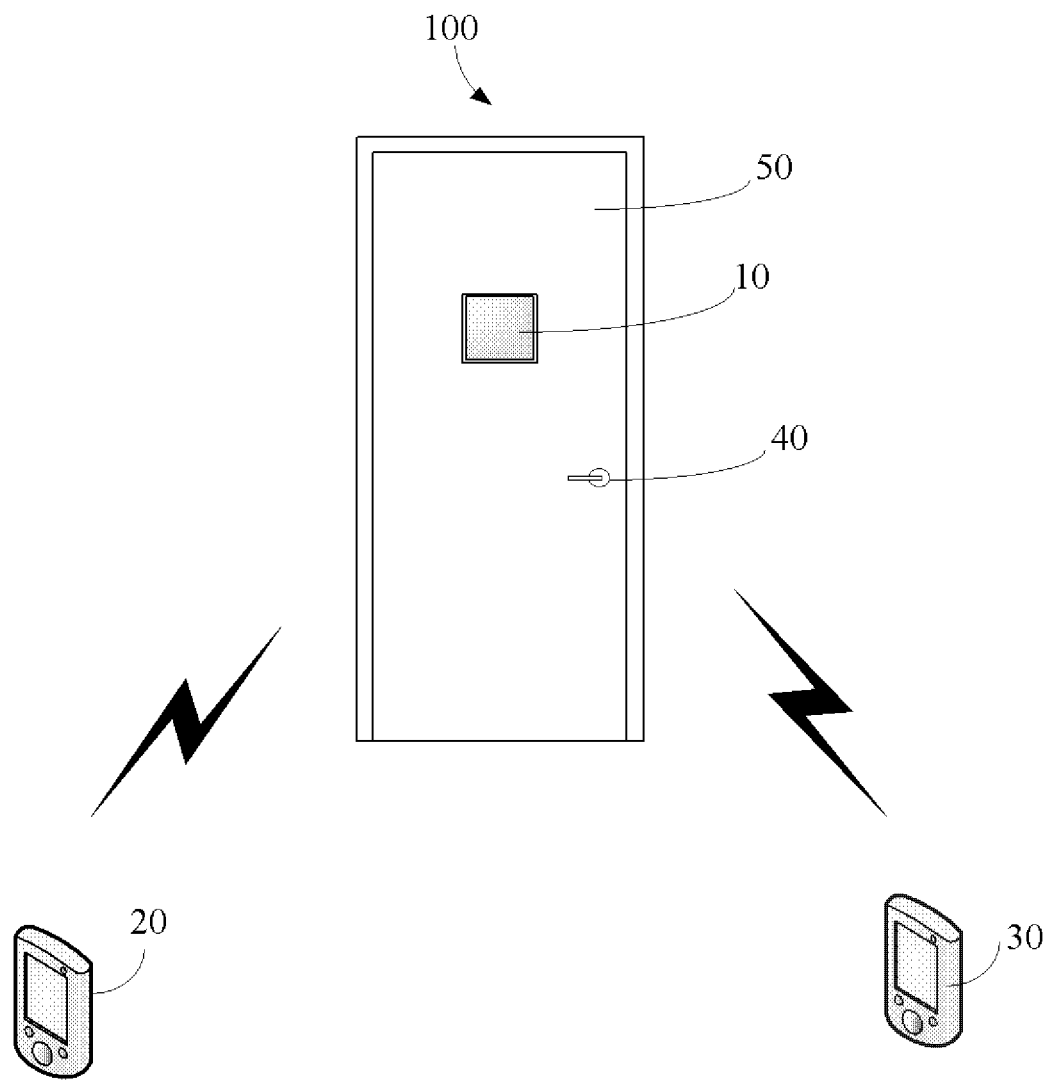
FIG. 1 shows an electronic locking system.

FIG. 1, illustrates an electronic locking system 100. The electronic locking system 100 includes a locking device 10, a host mobile terminal 20, a caller mobile terminal 30, and a locking mechanism 40. The host mobile terminal 20 and the caller mobile terminal 30 communicate with each other via wireless network. The wireless network may be general packet radio service (GPRS), global system for mobile communication (GSM), and code division multiple (CDMA), for example. A person who carries the host mobile terminal 20 is called the host. A person who carries the caller mobile terminal 30 is called the caller. The locking mechanism 40 is capable of locking and unlocking a door 50 of the host house. The locking device 10 is mounted in the door 50. The locking device 10 communicates with the caller mobile terminal 30 based on an authentication instruction from the host mobile terminal 20, and controls the locking mechanism 40 to be opened when the caller in possession of the caller mobile terminal 30 calls at the host house.

Figure 2:
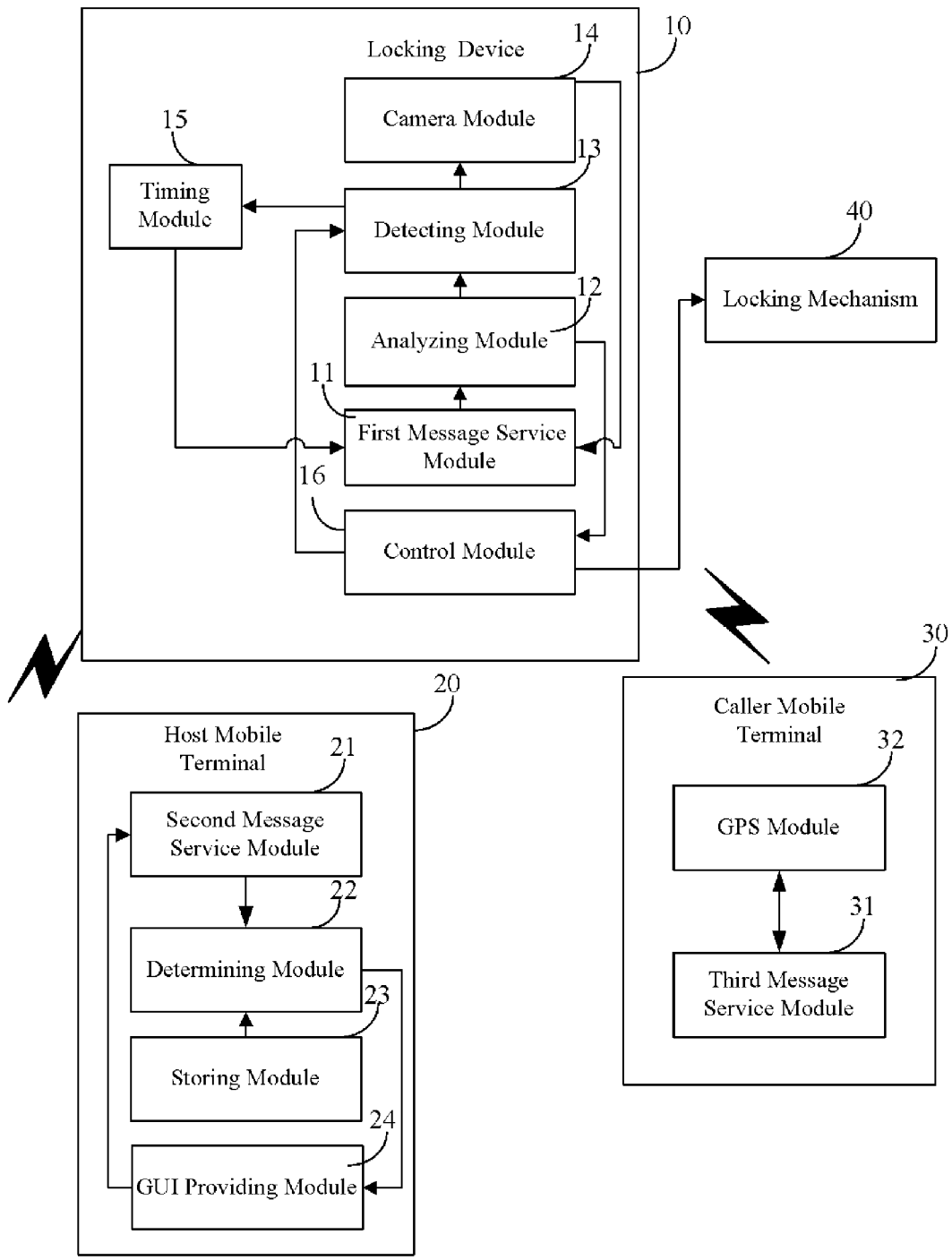
FIG. 2 shows a block diagram of the functioning modules of the electronic locking system in FIG. 1.

Referring to FIG. 2 in this embodiment, the locking device 10 includes a first message service module 11, an analyzing module 12, a detecting module 13, a camera module 14, a timing module 15, and a control module 16. The first message service module 11 includes a short message service (SMS) module and a multimedia messaging service (MMS) module.

The first message service module 11 receives a message from the host mobile terminal 20, and transmits a message to the host mobile terminal 20. The message from the host mobile terminal 20 includes the authentication instruction containing an authentication code of the caller mobile terminal 30. The authentication code is a telephone number of the caller mobile terminal 30.

The analyzing module 12 analyzes the message from the host mobile terminal 20. The analyzing module 12 further generates a search instruction if the message from the host mobile terminal 20 includes the authentication instruction.

The first message service module 11 further transmits a position search instruction to the caller mobile terminal 30 according to the authentication code in response to the search instruction. The first message service module 11 further receives location information according to the position search instruction from the caller mobile terminal 30.

The detecting module 13 detects whether the caller mobile terminal 30 is within a predetermined distance based on the location information. The detecting module 13 further generates a capturing signal if the distance is within the predetermined distance. Otherwise, the detecting module 13 generates a timing signal when the caller mobile terminal 30 is out of the predetermined distance. The detecting module 13 detects whether a distance between the caller mobile terminal 30 and the locking mechanism 40 is within the predetermined distance based on the location information to determine whether the caller mobile terminal 30 is within the predetermined distance.

The timing module 15 begins to count a time in response to the timing signal, and generates the position search instruction to re-obtain the location information of the caller mobile terminal 30 and re-transmit the re-obtained location information to the locking device 10 when the time reaches a predetermined time.

The camera module 14 takes an image of the caller's face. The camera module 14 is a typical facial recognition system.

The first message service module 11 further transmits the image to the host mobile terminal 20, and receives an unlock instruction or a stop instruction from the host mobile terminal 20 according to the taken image.

The analyzing module 12 further analyzes and determines if the unlock instruction or the stop instruction is received. The control module 16 controls the locking mechanism 40 to be unlocked in response to the unlock instruction.

When the host comes near the door 50, the host can operate the host mobile terminal 20 to transmit the message containing the unlock instruction to the locking device 10. The analyzing module 12 analyzes the unlock instruction. The control module 16 controls the locking mechanism 40 to be unlocked in response to the unlock instruction. So, the locking device 10 not only enables the door 50 to be open for the caller according to the authentication instruction, but also enables the door 50 to be open for the host according to the unlock instruction.

The host mobile terminal 20 includes a second message service module 21, a determining module 22, a storing module 23, and a GUI providing module 24.

The second message service module 21 includes a SMS module and a MMS module. The second message service module 21 transmits a message to the locking device 10 and receives a message from the locking device 10. For example, the second message service module 21 is capable of transmitting the authentication instruction containing the authentication code of the caller mobile terminal 30, the unlock instruction, and the stop instruction to the locking device 10. The second message service module 21 is also capable of receiving the image from the locking device 10.

The storing module 23 stores a plurality of images of person faces.

The determining module 22 determines whether the taken image received matches one of the images in the storing module 23. The determining module 22 further generates the lock instruction to the locking device 10 when the image received does not match any one of the images in the storing module 23, and generates a warning signal.

Figure 3:
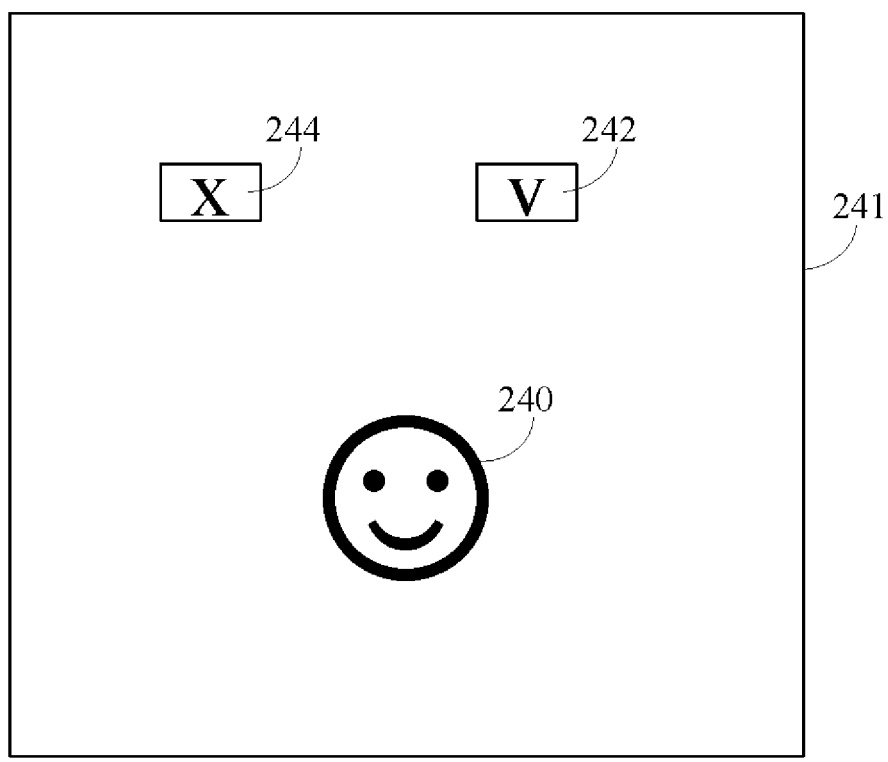
FIG. 3 shows a graphical user interface (GUI) provided by the electronic locking system in FIG. 1.

Referring to FIG. 3, the GUI providing module 24 provides a GUI 241 in response to the warning signal. The GUI 241 displays the received image 240, a validated button 242, and a non validated button 244. The host determines the caller based on the received image 240. The validated button 242 is activated by the host to generate the unlock instruction and transmit the unlock instruction via the second message service module 21 to the locking device 10. The non validated button 244 is activated by the host to generate the stop instruction and transmit the stop instruction via the second message service module 21 to the locking device 10. For example, the host recognizes that the image is the caller face, the host clicks the validated button 242, while the host recognizes that the image is not the caller face, the host clicks the non validated button 244.

The caller mobile terminal 30 includes a third message service module 31 and a global position system (GPS) module 32. The third message service module 31 may be SMS module or MMS module. The GPS module 32 receives the location information from GPS satellites (not shown), and transmits the location information to the locking device 10 via the third message service module 31.

Figure 4A:
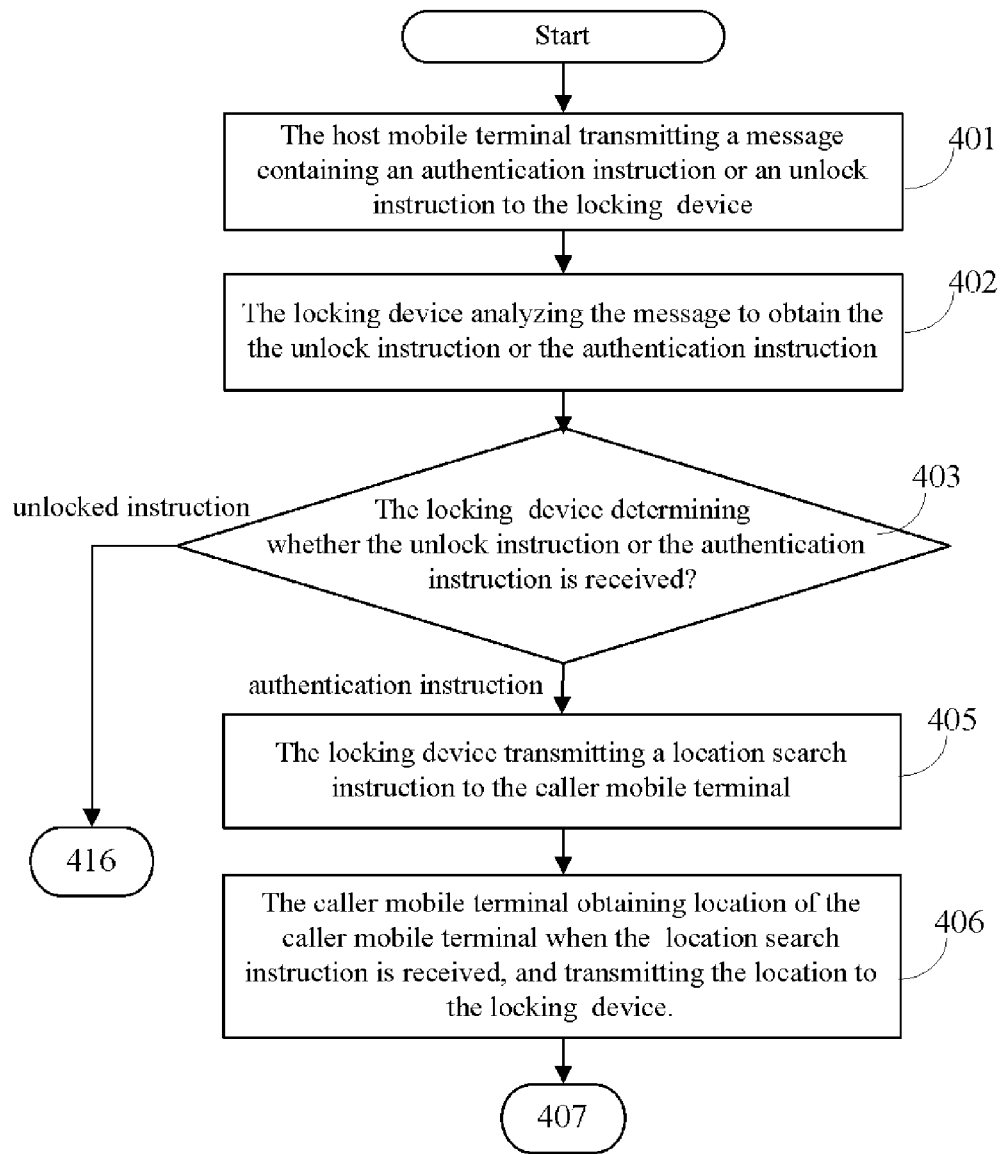
FIG. 4a and FIG. 4b show a flow chart of an unlocking method applied to the electronic locking system in FIG. 1.
Figure 4B:
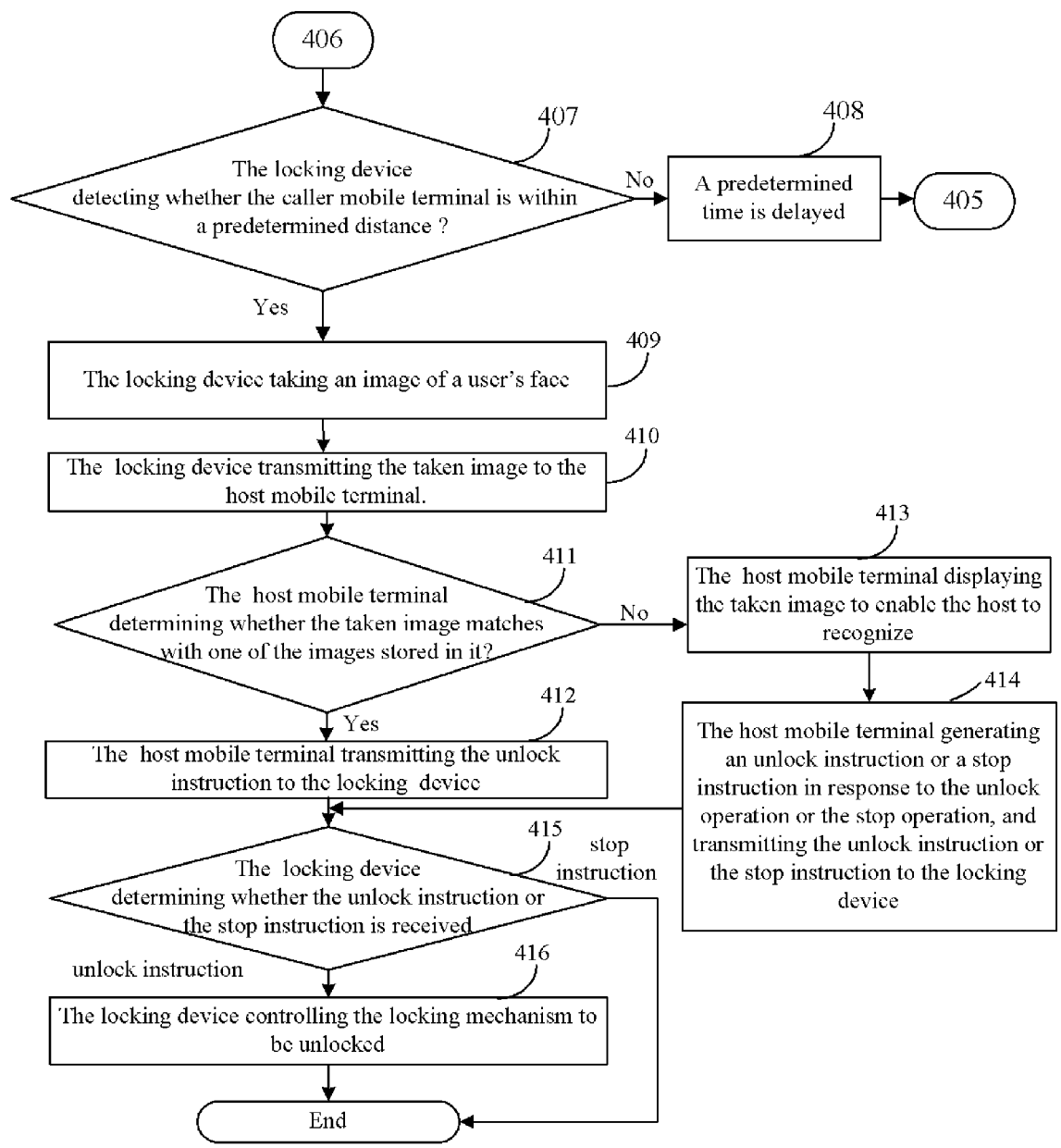

Referring to FIGS. 4a and 4b, a flow chart of the unlocking method is shown. The unlocking method is performed to enable a host mobile terminal, a locking device, and a caller mobile terminal to cooperatively lock or unlock a locking mechanism 40. The unlocking method includes the following steps:

In step 401, the host mobile terminal transmits a message containing an authentication instruction or an unlock instruction to the locking device. The authentication instruction includes an authentication code of the caller mobile terminal. The authentication code is the telephone number of the caller mobile terminal.

In step 402, the locking device analyzes the message and obtains the authentication instruction or the unlock instruction.

In step 403, the locking device determines whether the unlock instruction or the authentication instruction is received. If the unlock instruction is received, the process goes to step 416. If the authentication instruction is received, the process goes to step 405.

In step 405, the locking device transmits a location search instruction to the caller mobile terminal.

In step 406, the caller mobile terminal obtains the location information of the caller mobile terminal when the location search instruction is received, and transmits the location information to the locking device. For example, the caller mobile terminal includes a GPS, and the GPS receives the location information when the caller mobile terminal receives the location information from the locking device.

In step 407, the locking device detects whether the caller mobile terminal is within a predetermined distance based on the location information from the caller mobile terminal. For example, the locking device detects whether a distance between the caller mobile terminal and the locking device is within the predetermined distance, and the caller mobile terminal is determined to be within the predetermined distance if the distance between the caller mobile terminal and the locking device is within the predetermined distance. Or the locking device detects whether a distance between the caller mobile terminal and the locking mechanism is within the predetermined distance, and the caller mobile terminal is determined to be within the predetermined distance if the distance between the caller mobile terminal and the locking mechanism is within the predetermined distance. The process goes to the step 409 if the distance within the predetermined distance. Otherwise, the process goes to the step 408 if the distance is not within the predetermined distance.

In step 408, a predetermined time is delayed and the process goes to the step 405 again.

In step 409, the locking device takes an image of a user's face.

In step 410, the locking device transmits the image to the host mobile terminal.

In step 411, the host mobile terminal determines whether the taken image matches with one of the images stored in the host mobile terminal. The process goes to the step 412, if the taken image matches one of the images stored in the host mobile terminal. Otherwise, the process goes to the step 413.

In step 412, the host mobile terminal transmits the unlock instruction to the locking device, then the process goes to the step 415.

In step 413, the host mobile terminal displays the taken image to enable the host to recognize and perform an unlock operation or a stop operation.

In step 414, the host mobile terminal generates an unlock instruction or a stop instruction in response to the unlock operation or the stop operation, and transmits the unlock instruction or the stop instruction to the locking device.

In step 415, the locking device determines whether the unlock instruction or the stop instruction is received. The process ends when the stop instruction is received. Otherwise, the process goes to the step 416 when the unlock instruction is received.

In step 416, the locking device controls the locking mechanism to be unlocked.

As described above, the electronic locking system 100 and the unlocking method can automatically unlock the locking mechanism 40 if the caller who carries the caller mobile terminal 30 authorized by the host via the host mobile terminal 20. So the host does not need to go home to unlock the locking mechanism 40, and it is very convenient for the host.

It is to be understood, however, that even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A locking device cooperating with a host mobile terminal and a caller mobile terminal to unlock a locking mechanism, the locking device comprising:

an analyzing module configured to analyze whether an authentication instruction from the host mobile terminal is received, and further configured to generate a location search signal and transmit the location search signal to the caller mobile terminal when the authentication instruction from the host mobile terminal is received;

a detecting module configured to detect whether the caller mobile terminal is within a predetermined distance based on a location of the caller mobile terminal which is generated by the caller mobile terminal in response to the location search signal; and a control module capable of unlocking the locking mechanism when the caller mobile terminal is within the predetermined distance.

2. The locking device of claim 1, wherein the analyzing module is further configured to analyze whether an unlock instruction from the host mobile terminal is received, the control module controls the locking mechanism to be unlocked in response to the unlock instruction.

3. The locking device of claim 2, further comprising a camera module, wherein the camera module comprises a capturing module for taking an image of a user's face to be transmitted to the host mobile terminal when the caller mobile terminal is within the predetermined distance, the analyze module further analyzes a feedback on the taken image from the host mobile terminal and determines whether the feedback is the unlock instruction, and the control module controls the locking mechanism to be unlock in response to the unlock instruction.

4. The locking device of claim 1, further comprising a timing module beginning to count a time when the caller mobile terminal is within the predetermined distance, and generating the location search signal being transmitted to the caller mobile terminal when the time reached a predetermined time.

5. A host mobile terminal for transmitting an unlock instruction to control a locking device to unlock a locking mechanism when a caller mobile terminal is within a predetermined distance, the host mobile terminal comprising:

a message service module to transmit an authentication instruction to the locking device, and the message service module further receiving an image taken by the locking device when the caller mobile terminal is within the predetermined distance in response to the authentication instruction;

a storing module to store a plurality of images; and a determining module to determine whether the taken image matches one of the stored images, and generate the unlock instruction to transmit to the locking device via the message service module.

6. The host mobile terminal of claim 5, further comprising a graphical user interface (GUI) providing module, to provide a GUI to display the taken image, and a validated button when the determining module determines that the taken image does not match any one of the stored images, the validated button clicked by a user base on the taken image; the unlock instruction being generated when the validated button is clicked and transmitted to the locking device.

7. An unlocking method enabling a locking mechanism to be unlocked, the method comprising:

detecting whether an authentication instruction from a host mobile terminal is received;

transmitting a location search instruction to a caller mobile terminal when the authentication instruction is received;

receiving a location of the caller mobile terminal from the caller mobile terminal, the location generated in response to the location search instruction;

determining whether the caller mobile terminal is within a predetermined distance based on the location information; and unlocking the locking mechanism when the caller mobile terminal is within the predetermined distance.

8. The unlocking method of claim 7, wherein between the step of determining whether the caller mobile terminal is within a predetermined distance based on the location information and the step of unlocking the locking mechanism, the unlocking method further comprises:

taking an image of person face when the caller mobile terminal is within the predetermined distance;

determining whether an unlock instruction generated by the host mobile terminal in response to the taken image is received; and unlocking the locking mechanism when the unlock instruction is received.

9. The unlocking method of claim 8, wherein the step of determining whether the caller mobile terminal is within a predetermined distance based on the location information is performed by determining a distance between the caller mobile terminal and the locking mechanism is within the predetermined distance based on the location information, and the caller mobile terminal is determined to be within the predetermined distance when the distance between the caller mobile terminal and the locking mechanism is within the predetermined distance.

10. The unlocking method of claim 7, wherein before the step of transmitting a location search instruction to a caller mobile terminal in response to the authentication instruction, the unlocking method further comprises:

determining whether an unlock instruction from the host mobile terminal is received; and controlling the locking mechanism to be unlock when the unlock instruction is received.

* * * * *